United States Patent
Rawlinson

(10) Patent No.: US 9,016,765 B1
(45) Date of Patent: Apr. 28, 2015

(54) READILY REPLACEABLE EV BATTERY PACK BALLISTIC SHIELD

(71) Applicant: Atieva, Inc., Redwood City, CA (US)

(72) Inventor: Peter Dore Rawlinson, Worcestershire (GB)

(73) Assignee: Atieva, Inc., Menlo Park, CA (US)

( * ) Notice: Subject to any disclaimer, the term of this patent is extended or adjusted under 35 U.S.C. 154(b) by 21 days.

(21) Appl. No.: 14/134,151

(22) Filed: Dec. 19, 2013

(51) Int. Cl.
| | |
|---|---|
| *B60K 1/04* | (2006.01) |
| *F41H 5/013* | (2006.01) |
| *F41H 7/00* | (2006.01) |
| *B60L 11/18* | (2006.01) |

(52) U.S. Cl.
CPC ............ *F41H 5/013* (2013.01); *F41H 7/00* (2013.01); *B60K 1/04* (2013.01); *B60L 11/1879* (2013.01); *B60K 2001/0438* (2013.01)

(58) Field of Classification Search
CPC . F41H 7/042; F41H 5/007; B60K 2001/0438; B60K 1/04; B60L 11/1879

USPC ............ 296/187.08; 89/36.08, 930, 937; 180/68.5; 429/9

See application file for complete search history.

(56) References Cited

U.S. PATENT DOCUMENTS

| | | | |
|---|---|---|---|
| 7,597,040 B2 * | 10/2009 | Gabrys | 89/36.02 |
| 8,286,743 B2 | 10/2012 | Rawlinson | |
| 8,393,427 B2 | 3/2013 | Rawlinson | |
| 2009/0242299 A1 * | 10/2009 | Takasaki et al. | 180/68.5 |
| 2010/0313745 A1 * | 12/2010 | Hawkins et al. | 89/36.08 |

* cited by examiner

*Primary Examiner* — Joseph D Pape
(74) *Attorney, Agent, or Firm* — Patent Law Office of David G. Beck

(57) ABSTRACT

A battery pack protection system is provided for use with an electric vehicle in which the battery pack is mounted under the car. The system utilizes a ballistic shield that is configured to deform and absorb impact energy, thereby minimizing the transference of impact energy to the battery pack and the batteries contained within the pack. The ballistic shield is designed to hook into a mounting base attached to the battery pack, thereby simplifying both its installation and, when necessary, its replacement.

20 Claims, 9 Drawing Sheets

READILY REPLACEABLE EV BATTERY PACK BALLISTIC SHIELD

FIELD OF THE INVENTION

The present invention relates generally to electric vehicles and, more particularly, to a system for providing undercarriage protection to the battery pack of an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

In recent years there have been several incidents of a rechargeable battery pack, either contained within a laptop computer or utilized in a vehicle, catching on fire. As a result, one of the primary issues impacting consumer confidence with respect to both hybrid and all-electric vehicles is the risk of a battery pack fire.

Rechargeable batteries tend to be relatively unstable and prone to thermal runaway, an event that occurs when a battery's internal reaction rate increases to such an extent that it is generating more heat than can be withdrawn. If the reaction rate and generation of heat go unabated, eventually the heat generated becomes great enough to cause the battery and materials in proximity to the battery to combust. While thermal runaway is typically the result of a battery short or a manufacturing defect, damage such as that which may occur during an accident or when road debris dents or punctures the battery pack may also lead to a thermal runaway event.

Due to the risk of a battery pack fire, hybrid and electric vehicle (EV) manufacturers use a variety of techniques to shield their battery packs from the possible damage that may result from road debris or a vehicle collision. For example, in a vehicle using a relatively small battery pack such as a hybrid, the pack may be protected by placing it within the rear trunk, behind the rear seats, under the front seats, or in another comparatively well protected location. Vehicles utilizing large battery packs typically are forced to mount the pack under the car. To protect such a pack, a ballistic shield may be located between the road surface and the bottom of the pack as disclosed in U.S. Pat. Nos. 8,286,743 and 8,393,427.

Although the prior art teaches a variety of mounting techniques that can either be used to place the battery pack in a relatively protected region of a car or to otherwise shield the battery pack from potential harm, given the severity of the consequences accompanying a catastrophic battery pack event, further techniques for protecting an undercarriage mounted battery pack are desired. The present invention provides such a protection system.

SUMMARY OF THE INVENTION

The present invention provides a battery pack protection system for use with an electric vehicle in which the battery pack is mounted under the car. The system utilizes a ballistic shield that is interposed between the battery pack and the road surface. The ballistic shield includes a shield mounting portion, a ballistic shield portion that is positioned closer to the road surface than the shield mounting portion, and at least one connecting member that couples the shield mounting portion to the ballistic shield portion. The shield mounting portion is attached to the battery pack via a ballistic shield mounting base. The mounting base has a ballistic shield coupling surface that includes a linear slot, where the axis that corresponds to the linear slot is substantially parallel to the lower surface of the battery pack. In cross-section, the linear slot is curved. The shield mounting portion of the ballistic shield has a curved edge section with a curvature that is complementary to the curvature of the linear slot, thus allowing the curved edge section to be inserted through the linear slot and partially rotated about the mounting base until a mounting surface of the shield mounting portion is substantially parallel to the lower surface of the battery pack. A plurality of fasteners, for example a plurality of bolts, may be used to attach a second edge of the shield mounting portion to the lower surface of the battery pack. Preferably the ballistic shield portion of the ballistic shield is substantially parallel to the mounting surface of the shield mounting portion. More preferably, the ballistic shield portion of the ballistic shield is substantially parallel to the road surface after the ballistic shield has been mounted to the battery pack. The connecting member used to couple the ballistic shield portion to the shield mounting portion may be perpendicular to the mounting surface of the shield mounting portion; alternately, the connecting member may be angled away from the curved edge section of the shield mounting portion of the ballistic shield; alternately, the connecting member may be angled towards the curved edge section of the shield mounting portion of the ballistic shield. The ballistic shield mounting base may be welded, brazed, bonded or bolted to the lower surface of the battery pack. The shield mounting portion, the ballistic shield portion and the connecting member that comprise the ballistic shield are preferably configured as a single piece and may, for example, be fabricated using an extrusion process. The ballistic shield is preferably fabricated from aluminum, steel or a composite material.

In another aspect of the invention, a mounting plate may be interposed between the ballistic shield mounting base and the lower surface of the battery pack, where the ballistic shield mounting base is directly attached to the mounting plate and the mounting plate is directly attached to the lower surface of the battery pack. The mounting plate, which may be welded, brazed, bonded or bolted to the lower surface of the battery pack, is preferably fabricated from aluminum, steel or a composite material. Preferably the mounting surface of the shield mounting portion will come to rest against the mounting plate when the curved edge section of the shield mounting portion is inserted through the linear slot and rotated partially about the ballistic shield mounting base. A plurality of fasteners, for example a plurality of bolts, may be used to attach a second edge of the shield mounting portion to the mounting plate.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "battery pack" and "battery pack enclosure" may be used interchangeably and refer to an enclosure containing one or more batteries electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
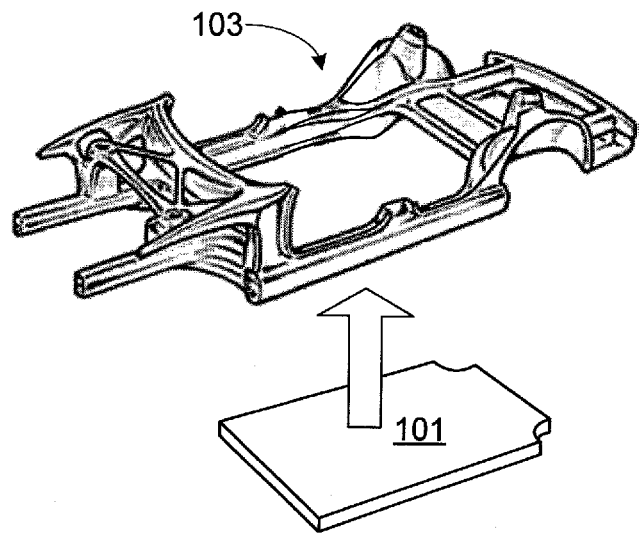
FIG. 1 provides a perspective view of a battery pack and the vehicle chassis to which it is to be mounted.

FIG. 1 provides a perspective view of a battery pack 101 configured to be mounted under vehicle chassis 103. It should be understood that the present invention is not limited to a specific battery pack mounting scheme, battery pack size, or battery pack configuration.

Figure 2:
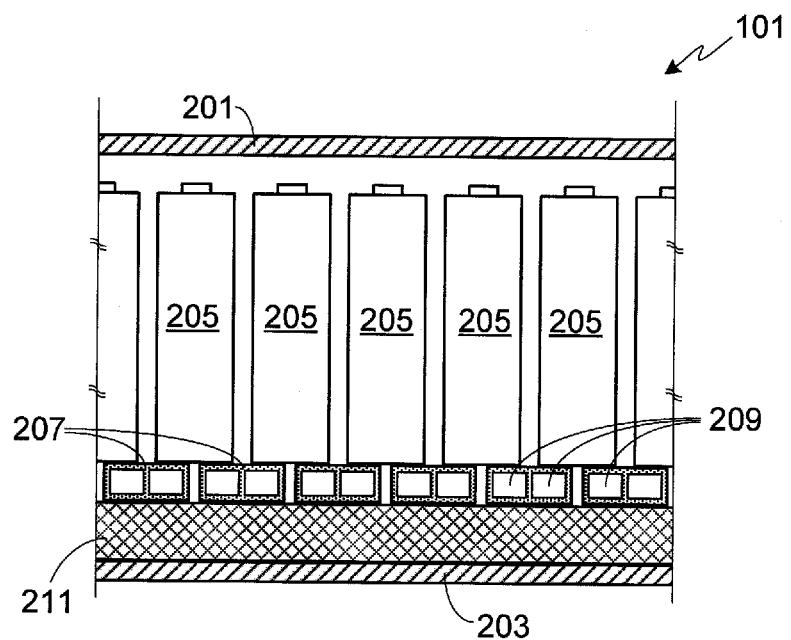
FIG. 2 provides a cross-sectional view of a portion of the battery pack shown in FIG. 1.

FIG. 2 provides a cross-sectional view of a portion of battery pack 101. For purposes of clarity, battery interconnects and battery mounts are not included in this view. Visible in FIG. 2 is a portion of the upper pack enclosure panel 201, a portion of the lower pack enclosure panel 203, and a plurality of batteries 205. Note that the enclosure side panels are not shown in this view. Batteries 205 are preferably cylindrical batteries, for example batteries utilizing an 18650 form-factor, and are preferably positioned within the battery pack so that the axis of the cylinder (i.e., the cylindrical axis) is substantially perpendicular to both lower enclosure panel 203 and the surface of the road. Although not required by the invention, in the exemplary battery pack 101 shown in FIG. 2, interposed between the base of each cylindrical battery 205 and lower panel 203 are a plurality of cooling conduits 207 through which a liquid coolant, i.e., a heat transfer medium, is pumped. As shown, in the preferred embodiment cooling conduits 207 are aligned with lower panel 203, resulting in the coolant within channels 209 flowing in a direction substantially perpendicular to the axes of the cylindrical batteries. By regulating the flow of coolant within conduits 207 and/or regulating the transfer of heat from the coolant to another temperature control system, the temperature of cells 205 may be regulated so that the cells remain within their preferred operating range. As it is generally desirable to limit thermal transfer between the cooling conduits 207 and the battery pack enclosure panel 203, preferably one or more thermally insulating layers 211 are added between the conduits and the battery pack enclosure as shown. Thermally insulating layer (s) 211 may be comprised of air or some other thermally insulating material that preferably has a thermal conductivity of less than 1.0 $Wm^{-1}K^{-1}$ at 25° C., and more preferably less than 0.2 $Wm^{-1}K^{-1}$ at 25° C.

Figure 3:
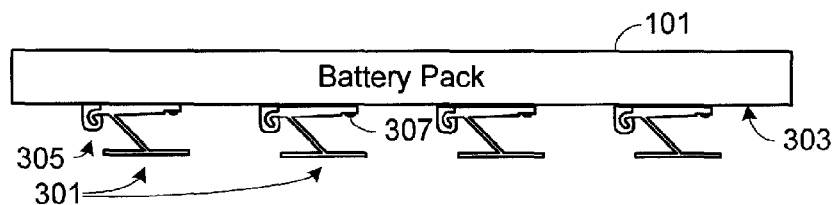
FIG. 3 provides a side view of a battery pack with four ballistic shields mounted to the bottom surface of the pack.

FIG. 3 provides a side view of battery pack 101 with four ballistic shields 301 mounted to bottom surface 303 of pack 101. As described in more detail below, each shield 301 is coupled to surface 303 via a hook assembly 305 and a plurality of fasteners 307. The purpose of each ballistic shield is to absorb impacts from road debris and other obstacles that would otherwise hit bottom surface 303 of pack 101 unchecked, potentially denting and possibly puncturing the battery pack as well as the batteries contained therein. It will be understood that the ballistic shield of the invention may be used alone, or multiple shields may be installed on the bottom surface 303 of the battery pack as shown and describe below.

Figure 4:
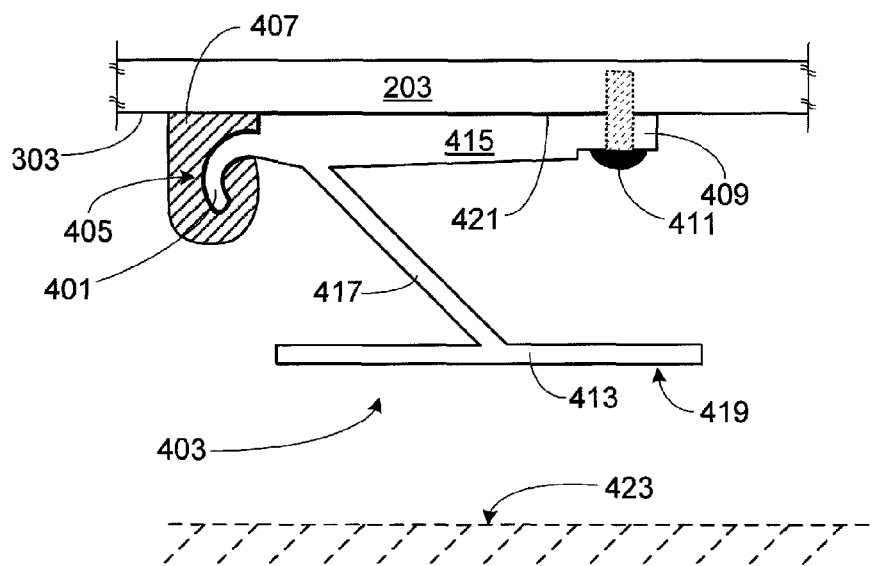
FIG. 4 provides a cross-sectional view of a mounted ballistic shield in accordance with the invention.
Figure 5:
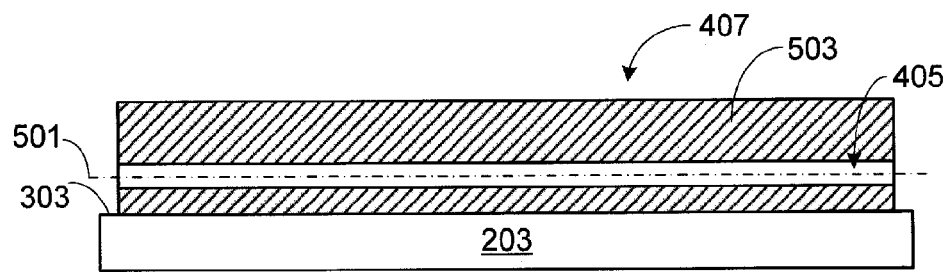
FIG. 5 provides an end view of the coupling surface and slot entrance for the shield mounting base shown in FIG. 4.

As shown in the detailed cross-sectional view provided in FIG. 4, an edge section 401 of ballistic shield 403 is curved, where the curvature and thickness of edge section 401 is designed to be captured by slot 405 within the shield mounting base 407. Mounting base 407 is attached to bottom surface 303 of battery pack enclosure panel 203, for example by welding, brazing or bonding, although other fastening means may be used (e.g., bolting base 407 to panel 203). Although in cross-section slot 405 is curved as shown in FIG. 4, the axis of slot 405, i.e., axis 501 of slot 405 in coupling surface 503 shown in FIG. 5, is preferably substantially parallel to surface 303 of the battery pack. After inserting, rotating and capturing shield edge section 401 into slot 405 of mounting base 407, second edge section 409 of shield mounting portion 415 is fastened to panel 203, for example using a plurality of bolts 411, thereby securing ballistic shield 403 in place. Preferably and as shown, shield portion 413 of ballistic shield 403 is separated from, and coupled to, the shield mounting portion 415 by a single, angled connecting member 417. Preferably the exterior surface of shield portion 413, i.e., the outermost portion of ballistic shield 403 and that portion closest to the road surface, is substantially parallel to mounting surface 421 of mounting portion 415, and more preferably substantially parallel to road surface 423 (shown in phantom). In at least one preferred embodiment, shield mounting portion 415, connecting member 417, and ballistic shield portion 413 are formed as a single piece, for example using an extrusion process, and fabricated from steel, aluminum or a composite material.

Figure 6:
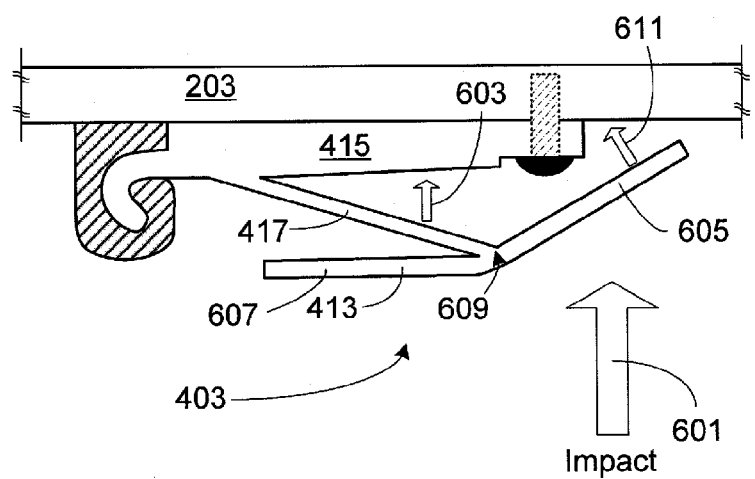
FIG. 6 illustrates the effects of an object impacting the shield portion of the ballistic shield shown in FIG. 4.
Figure 7:
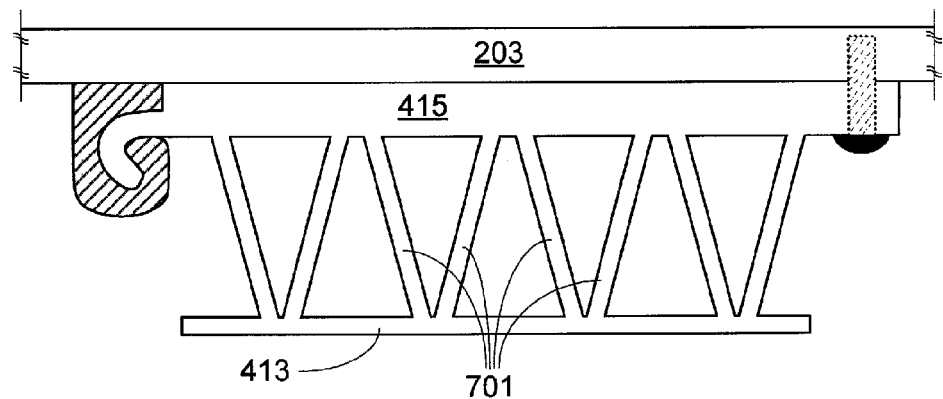
FIG. 7 illustrates a ballistic shield in which a plurality of connecting members rigidly couple the mounting portion to the shield portion of the ballistic shield.
Figure 8:
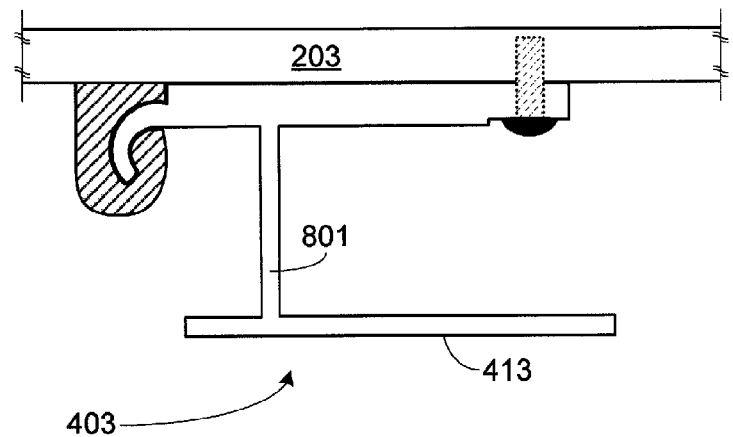
FIG. 8 illustrates a ballistic shield utilizing a single, non-angled connecting member to couple the mounting portion to the shield portion of the ballistic shield.
Figure 9:
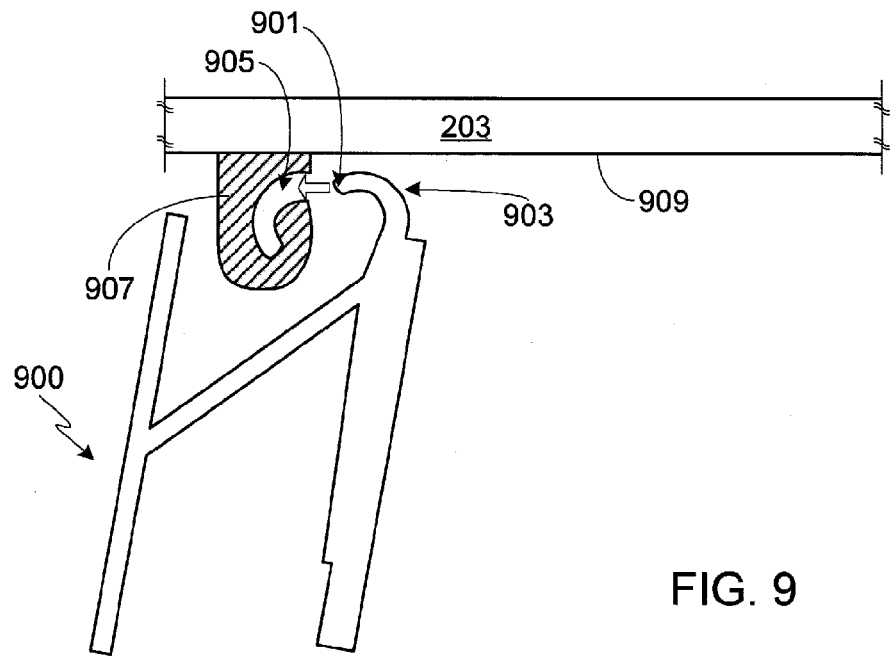
FIG. 9 illustrates the step of aligning the curved edge portion of the ballistic shield with the complementary slot within the shield mounting base.
Figure 10:
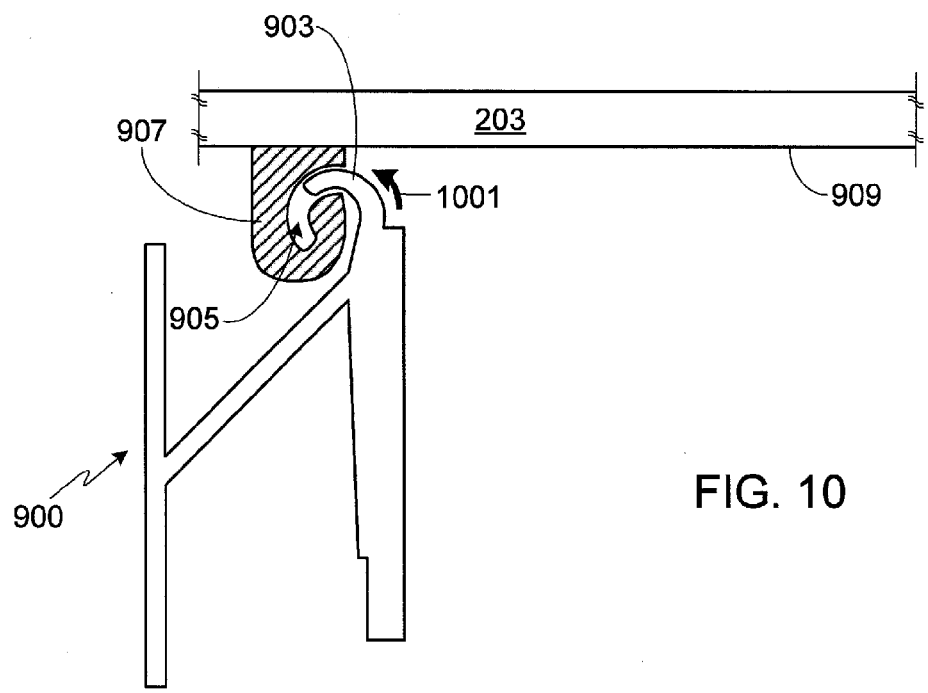
FIG. 10 illustrates the steps of inserting the curved edge portion of the ballistic shield into the complementary slot of the shield mounting base, and beginning rotation of the ballistic shield to lock it into place within the mount.
Figure 11:
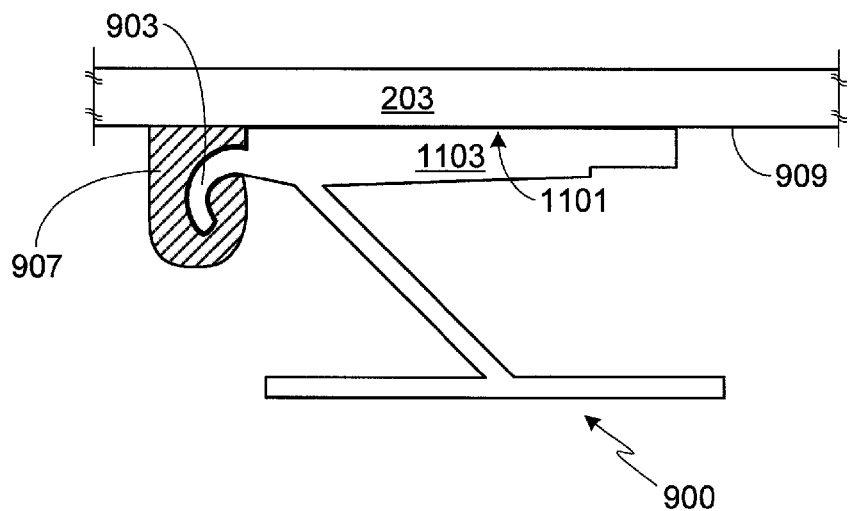
FIG. 11 illustrates the ballistic shield after completion of the insertion and rotating steps.

FIG. 6 illustrates the effect of an object impacting the shield portion 413 of ballistic shield 403, where the object is traveling along axis 601. As shown, during the impact the angled connecting member 417 at least partially collapses and is forced in a direction 603 toward mounting portion 415. Similarly, ballistic shield portion 413 is forced toward mounting portion 415. Note that in this example section 605 of shield portion 413 sustains a direct impact, unlike section 607, causing section 605 to bend about region 609 in a direction 611. As shield portion 413 and connecting member 417 collapse and bend, much of the impact energy is absorbed, thereby transferring little of the impact energy to the battery pack. In contrast, rigid coupling members 701 shown in FIG. 7 are unable to collapse and therefore rather than absorbing the impact energy, transfer most of the impact energy directly into battery pack enclosure panel 203. For this reason, in the preferred embodiment of the ballistic shield, ballistic shield portion 413 is coupled to mounting portion 415 by a collapsible, energy absorbing member or members, thus minimizing the impact energy transferred into the battery pack. Preferably a single connecting member is used (e.g., member 801 of FIG. 8), and more preferably a single, angled connecting member (e.g., member 417 of FIG. 4).

In addition to providing an energy absorbing ballistic shield that protects the lower pack surface of an exposed, undercarriage-mounted battery pack, the present invention provides a battery pack ballistic shield that is easily installed and, once damaged, easily replaced. FIGS. 9-12 illustrate the basic process of installing a ballistic shield 900. Initially the end surface 901 of the curved edge section 903 of shield 900 is aligned with the slot 905 of mounting base 907. As previously noted, mounting base 907 is attached to the bottom surface 909 of battery pack enclosure panel 203 via any of a variety of techniques (e.g., welding, brazing, bonding, bolting, etc.). Next, curved edge section 903 is inserted into slot 905 and ballistic shield 900 is rotated in a direction 1001 (see FIG. 10). Rotation of the ballistic shield in direction 1001 continues until surface 1101 of shield mounting portion 1103 rests against surface 909 of enclosure panel 203 (see FIG. 11) at which point a plurality of fasteners, e.g., bolts 1201, are used to fasten the ballistic shield 900 to the battery pack enclosure (see FIG. 12). Removal of ballistic shield 900, for example in order to replace a damaged shield, simply follows the procedure outlined above, but in reverse.

It should be understood that the size and number of ballistic shields attached to a battery pack will depend upon a number of factors, such as battery pack size, battery pack exposure and the desired level of protection. Accordingly and as previously noted, the present invention is not limited to a specific ballistic shield configuration. Exemplary variations of the basic ballistic shield described above are shown in FIGS. 13-17.

Figure 13:
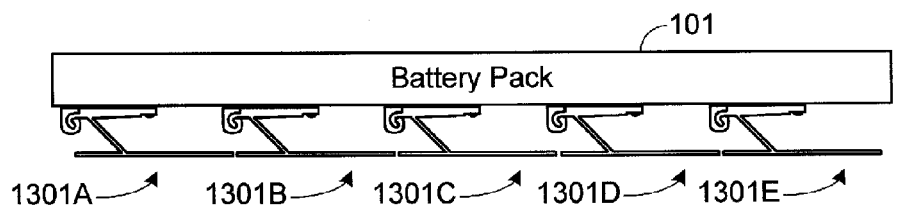
FIG. 13 provides a side view of a battery pack with five, minimally spaced apart, ballistic shields mounted to the bottom surface of the pack.
Figure 14:
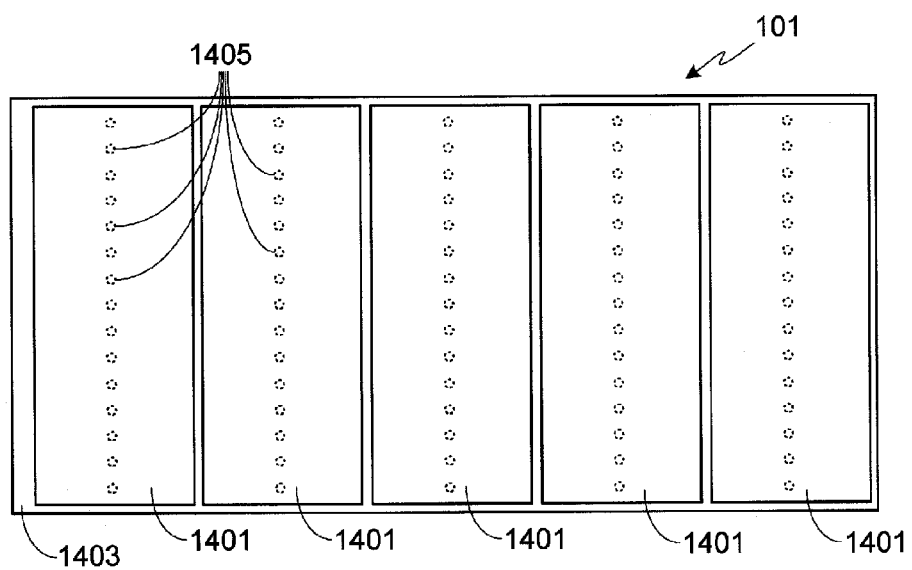
FIG. 14 provides a bottom view of a battery pack with five, minimally spaced apart, ballistic shields.
Figure 15:
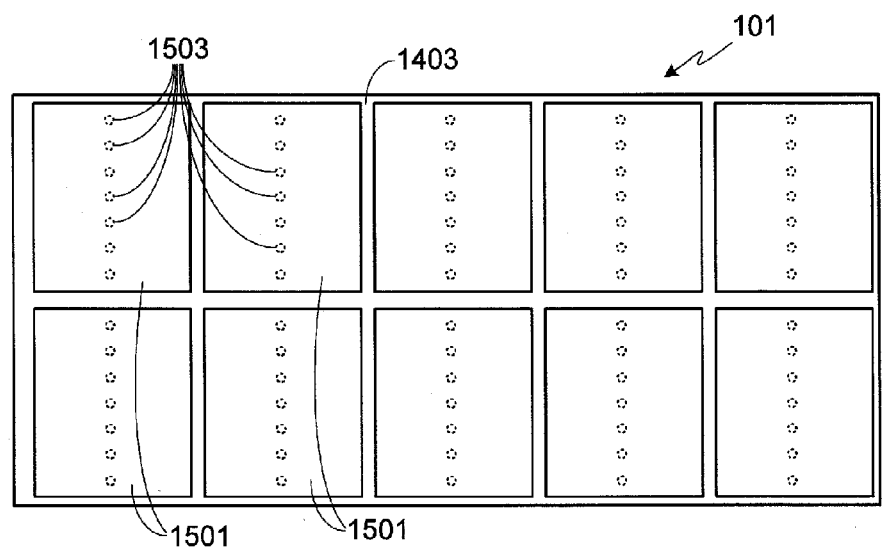
FIG. 15 provides a bottom view of a battery pack with ten, minimally spaced apart, ballistic shields utilizing a side-by-side arrangement.

In the embodiment illustrated in FIG. 13, rather than spacing the shields apart as shown in FIG. 3, each ballistic shield 1301A-1301E is mounted in close proximity to the shield on either side of it unless it is the last shield in a row (e.g., ballistic shields 1301A and 1301E). In this embodiment, in addition to increasing the number of ballistic shields, the size of each shield member has also been increased, thereby providing enhanced pack protection. FIGS. 14 and 15 provide a bottom view of battery pack 101. In the embodiment shown in FIG. 14, five ballistic shields 1401 substantially cover the bottom surface 1403 of the battery pack. In the embodiment shown in FIG. 15, ten ballistic shields 1501 cover approximately the same amount of surface area, but utilizing two shields in a side-by-side configuration for each row. The approach illustrated in FIG. 15 can simplify fabrication and reduce the cost of shield replacement, when necessary, as the shields are smaller and therefore less expensive to fabricate. It will be appreciated that more than two ballistic shields can be located in a side-by-side configuration. For clarity, the underlying shield fastening bolts 1405 and 1503 used with shields 1401 and 1501, respectively, are shown, although they are shown in phantom since they are not actually visible in these views.

Figure 12:
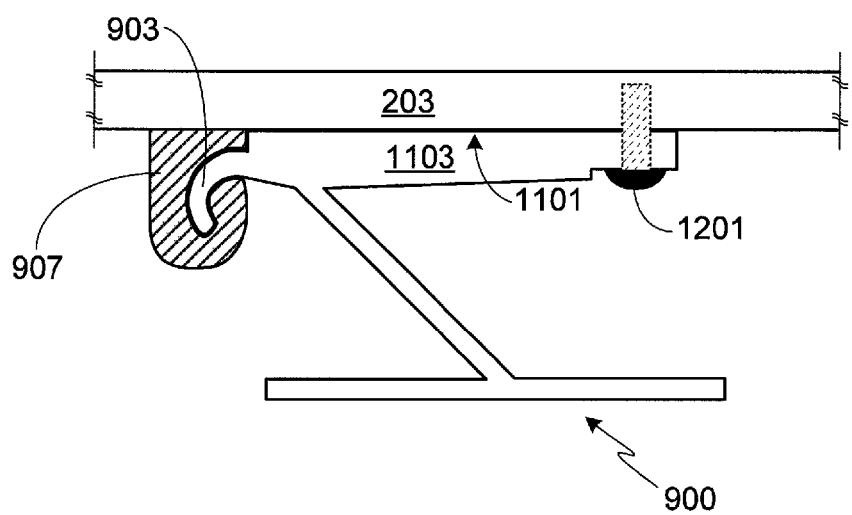
FIG. 12 illustrates fastening the ballistic shield in place.
Figure 16:
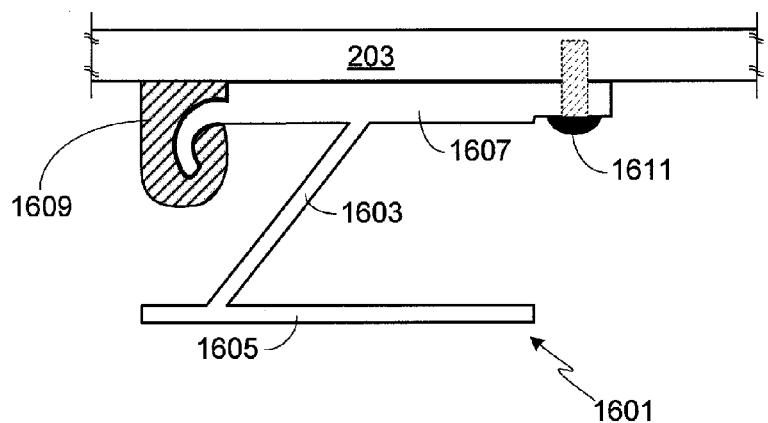
FIG. 16 provides a cross-sectional view of a mounted ballistic shield in which the angle of the connecting member is reversed from that shown in FIG. 12.

FIG. 16 provides a side view of a ballistic shield 1601 which is similar to that shown in FIG. 12, except that the angled connecting member 1603 that couples the shield portion 1605 to the mounting portion 1607 is angled towards base 1609 rather than away from the base as in the previous embodiment. The primary benefit of this configuration is that it provides easier access to fastening bolts 1611.

Figure 17:
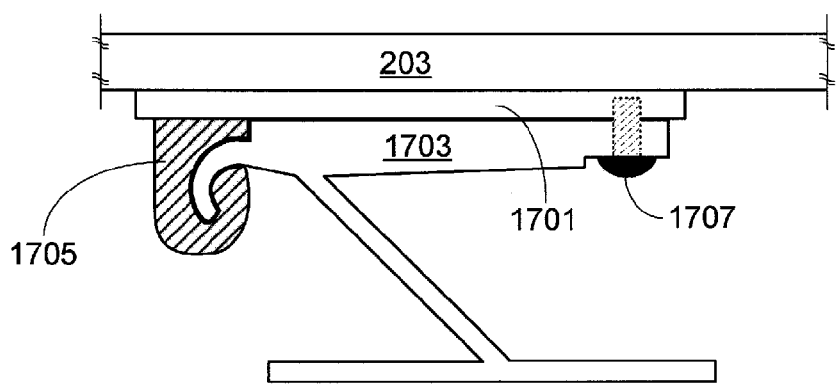
FIG. 17 provides a cross-sectional view of a mounted ballistic shield with a mounting plate interposed between the ballistic shield mounting member and the battery pack enclosure.

In the embodiments described above, when the ballistic shield is mounted to the battery pack, the mounting surface of the ballistic shield is immediately adjacent to the outer surface of the battery pack enclosure. Similarly, the mounting base (e.g., base 407 in FIG. 4 and base 907 in FIGS. 9-12) used to capture the curved edge section of the ballistic shield is attached directly to the battery pack enclosure. In should be understood, however, that one or more mounting plates may be interposed between the battery pack enclosure panel 203 and the ballistic shield and its mount without departing from the invention. This intervening plate (or plates) may be used for any of a variety of reasons, including simplifying the mounting process, improving the shield's mechanical characteristics, improving the battery pack's thermal characteristics, or for other reasons. An exemplary configuration utilizing a mounting plate is illustrated in FIG. 17, based on the embodiment shown in FIG. 12. In this configuration a mounting plate 1701, fabricated from a suitable material (e.g., steel, aluminum, a composite, etc.), is interposed between the ballistic shield mounting portion 1703 and the battery pack enclosure wall 203. Preferably and as shown, ballistic shield mounting base 1705 is attached to plate 1701, for example by welding, brazing, bonding, bolting or other means). Note that the ballistic shield fasteners, e.g., bolts 1707, may only be attached to mounting plate 1701 as shown, or pass completely through plate 1701 and be attached to enclosure wall 203.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:
1. A battery pack protection system, comprising:
a battery pack mounted under an electric vehicle, wherein said battery pack is configured to house a plurality of batteries;

a ballistic shield mounting base attached to a lower surface of said battery pack, said ballistic shield mounting base including a ballistic shield coupling surface, wherein said ballistic shield coupling surface includes a linear slot, wherein an axis corresponding to said linear slot is substantially parallel to said lower surface of said battery pack, and wherein said linear slot is curved in cross-section;

a ballistic shield interposed between said battery pack and a road surface, said ballistic shield comprising:
  a shield mounting portion, wherein said shield mounting portion includes a curved edge section, wherein a first curvature corresponding to said curved edge section is complementary to a second curvature corresponding to said linear slot, wherein said curved edge section is configured to be inserted through said linear slot and rotated partially about said ballistic shield mounting base until a mounting surface of said shield mounting portion is substantially parallel to said lower surface of said battery pack;
  a ballistic shield portion, wherein said ballistic shield portion is closer to said road surface than is said shield mounting portion; and
  a connecting member, wherein said connecting member couples said shield mounting portion to said ballistic shield portion.

2. The battery pack protection system of claim 1, wherein said ballistic shield portion is substantially parallel to said mounting surface of said shield mounting portion.

3. The battery pack protection system of claim 1, wherein said ballistic shield portion is substantially parallel to said road surface after said curved edge section is inserted through said linear slot and rotated partially about said ballistic shield mounting base causing said mounting surface of said shield mounting portion to be substantially parallel to said lower surface of said battery pack.

4. The battery pack protection system of claim 1, wherein said connecting member is substantially perpendicular to said mounting surface of said shield mounting portion.

5. The battery pack protection system of claim 1, wherein said connecting member angles away from said curved edge section of said shield mounting portion.

6. The battery pack protection system of claim 1, wherein said connecting member angles toward said curved edge section of said shield mounting portion.

7. The battery pack protection system of claim 1, further comprising a plurality of fasteners, wherein said plurality of fasteners attach a second edge section of said shield mounting portion to said lower surface of said battery pack.

8. The battery pack protection system of claim 7, said plurality of fasteners comprising a plurality of bolts.

9. The battery pack protection system of claim 1, wherein said ballistic shield mounting base is attached to said lower surface of said battery pack via welding, brazing or bonding.

10. The battery pack protection system of claim 1, wherein said ballistic shield mounting base is bolted to said lower surface of said battery pack.

11. The battery pack protection system of claim 1, wherein a single piece of material comprise said shield mounting portion, said ballistic shield portion and said connecting member.

12. The battery pack protection system of claim 11, wherein said single piece of material comprising said shield mounting portion, said ballistic shield portion and said connecting member is extruded.

13. The battery pack protection system of claim 11, wherein said single piece of material is selected from the group of materials consisting of aluminum, steel and composite materials.

14. The battery pack protection system of claim 1, further comprising a mounting plate interposed between said ballistic shield mounting base and said lower surface of said battery pack, wherein said ballistic shield mounting base is directly attached to said mounting plate and said mounting plate is directly attached to said lower surface of said battery pack.

15. The battery pack protection system of claim 14, wherein said mounting surface of said shield mounting portion rests against said mounting plate when said curved edge section is inserted through said linear slot and rotated partially about said ballistic shield mounting base.

16. The battery pack protection system of claim 14, further comprising a plurality of fasteners, wherein said plurality of fasteners attach a second edge section of said shield mounting portion to said mounting plate.

17. The battery pack protection system of claim 16, said plurality of fasteners comprising a plurality of bolts.

18. The battery pack protection system of claim 14, wherein said mounting plate is attached to said lower surface of said battery pack via welding, brazing or bonding.

19. The battery pack protection system of claim 14, wherein said mounting plate is bolted to said lower surface of said battery pack.

20. The battery pack protection system of claim 14, wherein said mounting plate is fabricated from a material selected from the group of materials consisting of aluminum, steel and composite materials.

* * * * *